Feb. 19, 1963  E. J. SCHAEFER  3,078,407
REVERSIBLE MOTOR DRIVE MECHANISM
Filed Feb. 29, 1960  2 Sheets-Sheet 1
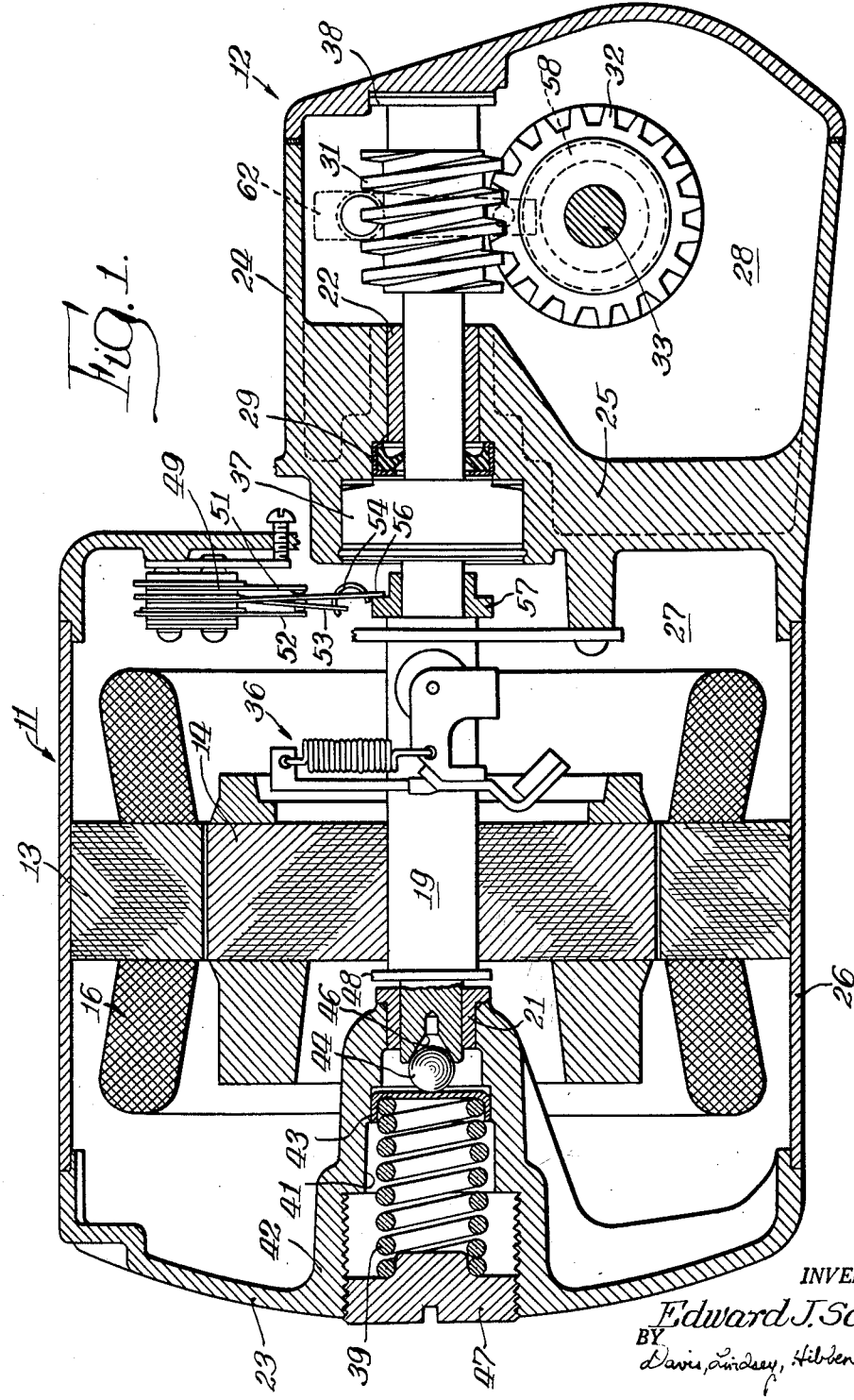
INVENTOR.
Edward J. Schaefer,
BY Davis, Lindsey, Hibben & Noyes
Attys.

Feb. 19, 1963     E. J. SCHAEFER     3,078,407
REVERSIBLE MOTOR DRIVE MECHANISM
Filed Feb. 29, 1960     2 Sheets-Sheet 2
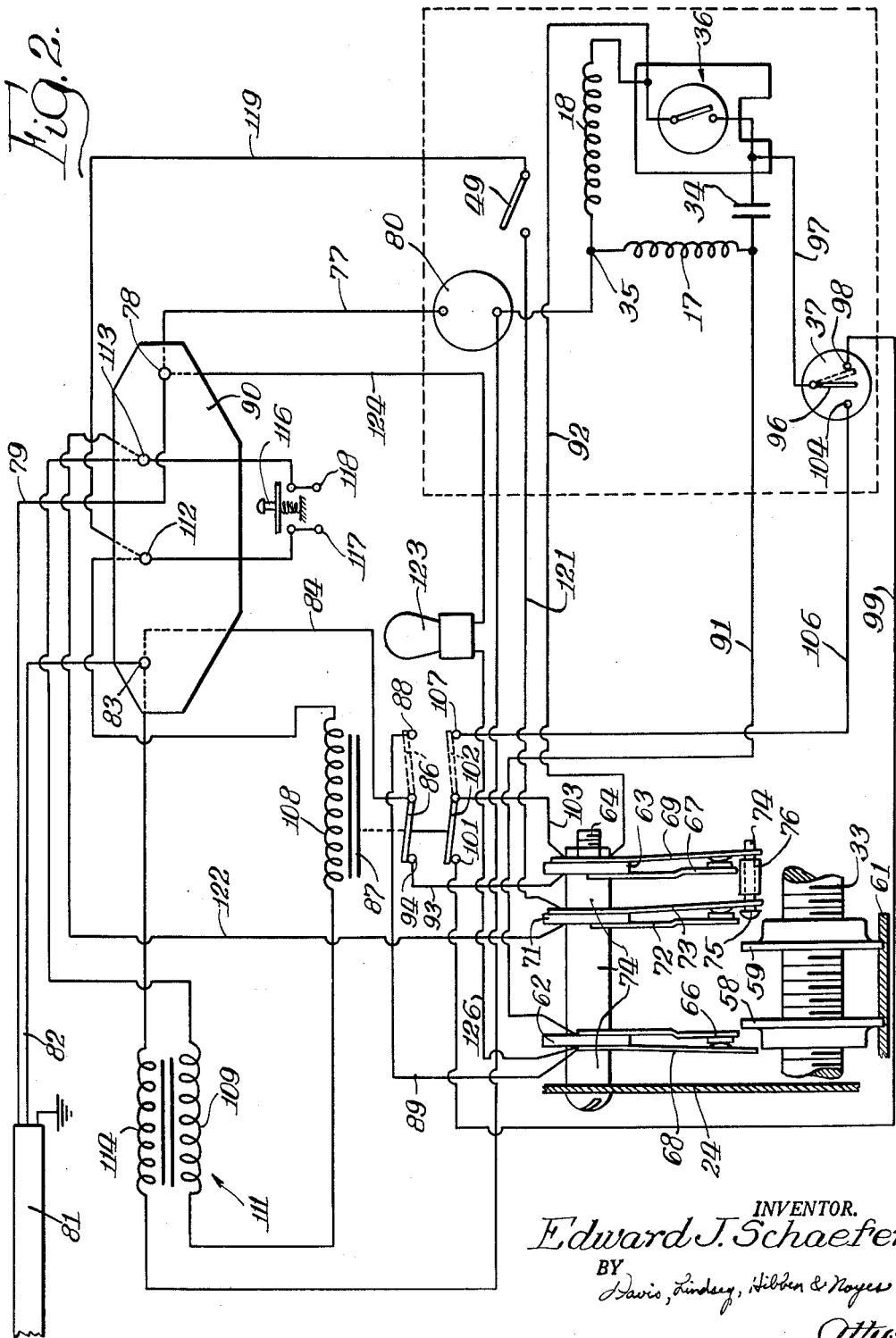
INVENTOR.
Edward J. Schaefer
BY
Davis, Lindsey, Hibben & Noyes
Attys United States Patent Office 3,078,407
Patented Feb. 19, 1963

3,078,407
REVERSIBLE MOTOR DRIVE MECHANISM
Edward J. Schaefer, % Franklin Electric Co.,
400 E. Spring St., Bluffton, Ind.
Filed Feb. 29, 1960, Ser. No. 11,699
16 Claims. (Cl. 318—475)

This invention relates to drive mechanisms and more particularly to a reversible motorized drive mechanism.

Frequently, when motors are used in drive mechanisms it is important to detect changes in the load on the drive or in the force exerted by the drive. Thus, the change may indicate a dangerous overload condition. For example, a motorized drive for garage door opening and closing apparatus is usually reversible and may be either manually or electronically controlled. In either type, the drive mechanism is subjected to a load which normally does not exceed a predetermined value during the opening and closing of its associated garage door. However, if the garage door meets some obstruction during closing, the load on the drive mechanism is suddenly increased. Consequently, if movement of the door is not stopped or reversed immediately, the door or the drive mechanism, or both, may be damaged. Heretofore, safety devices, such as slip clutches and the like, have been provided in these drive mechanisms in an effort to avoid overload damage. Although such slip clutches are effective in minimizing or preventing damage, they are not usually adapted to effect a positive action, such as a change in direction of operation of the drive motor.

It is the primary object of the present invention to provide a novel drive mechanism having a quick acting device responsive to load changes and adapted to effect a positive action when the drive mechanism is subjected to a load exceeding a predetermined value.

Another object of the invention is to provide a drive mechanism which will automatically and quickly change its direction of operation when overloaded.

Another object is to provide a drive mechanism which normally alternates its direction of operation each time it is started and which, when operating in one direction, will automatically and quickly change its direction of operation upon being subjected to a load exceeding a predetermined value.

Yet another object is to provide a novel drive mechanism that is load responsive and is also simple, compact, inexpensive, and reliable.

Still another object of the invention is to provide a novel reversible drive mechanism for use in conjunction with garage door opening and closing apparatus.

Other objects and advantages will become apparent from the following description taken in conjunction with the accompanying drawings wherein:

FIG. 1 is a sectional view taken longitudinally of a drive mechanism embodying the present invention; and FIG. 2 is a diagrammatic view of the control circuit for the drive mechanism shown in FIG. 1.

When a drive mechanism is operating, reaction forces are generated in the drive mechanism. These forces always oppose the force exerted by the drive mechanism on its load. The present invention utilizes one of these reaction forces, preferably a thrust force, for moving a part of the drive mechanism, such as a shaft therein, when the drive is subjected to a load exceeding a predetermined value. When the part moves, it, in turn, actuates a control element which may be connected to stop the drive, effect reversal of the drive, or effect some other desired change.

A form of the drive mechanism embodying the present invention and adapted for use in conjunction with garage door opening and closing apparatus, for example, includes an electric motor, a drive for connecting the motor to the opening and closing apparatus, and a control device that is responsive to a thrust force generated in the mechanism as a consequence of load exerted by the apparatus. The drive motor is of the instantly reversing type so that the drive can be operated in either the forward or reverse direction. The drive is preferably a worm and wheel which inherently develops an axial thrust on the worm, and consequently on a shaft to which the worm is attached. Such shaft is axially movable, so that the thrust tends to move the shaft in the direction of the thrust. During normal operation the shaft is prevented from moving axially by yieldable means such as a spring which presses against the end of the shaft. However, when the thrust reaches a predetermined value, the spring permits the shaft to move and the movement of the shaft is utilized to actuate a switch connected to stop and reverse the operation of the motor. Thus, the movable shaft and the switch form the load responsible control or safety device.

The motor 11, in the present instance, is illustrated as a conventional form of single phase motor, having a stator 13 and a squirrel case rotor 14. The stator 13 includes the usual starting and running windings, indicated generally at 16, but which are actually a pair of similar windings 17 and 18 connected as shown in FIG. 2 and alternately used as starting and running windings. The rotor 14 is mounted on a rotor shaft 19, rotatably journalled in sleeve bearings 21 and 22 located on opposite sides of the rotor 14. The bearings 21 and 22 are, in turn, mounted in a transverse end bell 23 and a transverse wall 25, respectively, the wall 25 being part of a housing 24. The end bell 23 and the wall 25 engage opposite ends of a shell 26 to form a casing or frame that encloses a motor cavity 27 containing the stator and rotor. The housing 24 encloses a cavity 28 which contains the drive 12 and is separated from the cavity 27 by the wall 25 and an oil seal 29.

The drive 12, in the present instance, comprises a worm 31 and a worm wheel 32 driven by the worm 31. The shaft 19 extends into the housing 24 and the worm 31 is mounted on the shaft 19 near its right end, as seen in FIG. 1. The worm wheel 32 is mounted on a drive shaft 33 which extends transversely to the shaft 19 and is adapted to drive the garage door opening and closing apparatus in the usual manner.

To operate a garage door opening and closing apparatus, it is desirable that the motor 11 develop fairly high torque during starting and be operable in both forward and reverse directions. To this end, the motor 11 is preferably of the capacitor start type having a capacitor 34 (see FIG. 2) connected across ends of the windings 17 and 18. The opposite ends of the windings 17 and 18 are both connected to a terminal 35. The capacitor 34 is connected in series with a centrifugal switch 36 of the usual form which opens when the motor attains operating speed. As shown in FIG. 1, the centrifugal switch 36 is mounted on the rotor shaft 19 at one side of the rotor 14. The windings 17 and 18 are substantially equal so that either may serve as a starting winding or as a running winding, depending on the direction of operation of the motor. The motor 11 is also provided with a rotation sensing switch 37 connected in shunt relation to the centrifugal switch 36 as shown in my prior Patent No. 2,847,629, so that the motor 11 is instantly reversible. The rotation sensing switch 37 is located in the transverse wall 25 for cooperation with the rotor shaft 19.

The motor shaft 19, during normal operation, occupies the position shown in FIG. 1. In this position the right end of the drive shaft bears against a thrust pad 38 carried by the housing 24. A compression spring 39, located at the opposite end of the shaft 19, urges the shaft toward the pad 38. The spring 39 is mounted in a bore 41 formed in a boss 42 on the end bell 23. One end of the spring 39 is seated in a cup-shaped member 43 which bears against a ball 44 seated in a tapered socket 46 formed in the left end of the shaft 19. The opposite end of the spring 39 bears against an adjusting nut 47 threaded into the outer end of the bore 41. By adjusting the position of the nut 47 in the bore 41, the force exerted by the spring 39 on the shaft 19 may be adjusted. Thus, the spring 39 may be preloaded to urge the shaft 19 against the thrust pad 38 in normal operation of the motor. If, however, axial force on the shaft 19 toward the left exceeds the preloading of the spring, the shaft 19 will slide in the sleeve bearings 21 and 22 and compress the spring 39. Movement of the shaft 19 toward the spring 39 is limited by a shaft washer 48 carried on the shaft 19 and adapted to abut the sleeve bearing 21.

On the wall 25, adjacent the shaft 19 and inside the motor cavity 27, is mounted a control switch 49 which is arranged to be actuated by the axial movement of the shaft 19 toward the spring 39. In the present instance, with the drive mechanism used for operating garage door opening and closing apparatus, the switch 49 may be connected, as shown in FIG. 2, to change the direction of motor operation in the event of overload, as discussed more fully hereinafter. The switch 49 is a conventional form of single-throw switch having a fixed contact arm 51, a fixed stop arm 52, and a movable contact arm 53 located between the fixed contact arm 51 and the fixed stop arm 52. To provide a snap action, the movable contact arm 53 is connected by a C-shaped spring 54 to an actuating arm 56, the arms 53 and 56 and the spring 54 being arranged so that movable contacts on the arms 51 and 53 are normally engaged and the switch 49 is closed. However, an insulating collar 57 mounted on the shaft 19 bears against the end of the actuating arm of 56 when the load is below the predetermined value, and holds the movable contact arm 53 against the stop arm 52, thus separating the contacts on the arms 53 and 51. Consequently, when the shaft 19 is shifted axially toward the spring 39, the switch spring 54, coacting with the actuating arm 56 and the movable contact arm 53, will shift the movable contact arm 53 to a position closing its contact on that carried by the fixed contact arm 51. When the shaft 19 moves back to its normal position, the movable contact arm 53 will be shifted back to the open position.

The present drive mechanism also includes means for limiting operation of the drive in either direction of operation. In the present form, the rotation of the shaft 33 is used as a measure of operation in the respective directions. Thus, the shaft 33 is threaded for a portion of its length, as shown in FIG. 2, and a pair of threaded collars 58 and 59 are mounted in spaced relation on the shaft 33. The collars are held against rotation with the shaft 33 by an arm 61 having one end (not shown) fixed to the housing 24. Thus the collars 58 and 59 will move in unison, one direction or the other, with respect to shaft 33 as a consequence of rotation of the shaft in forward and reverse directions.

A pair of normally closed limit switches 62 and 63 are mounted in spaced relation adjacent the shaft 33 and are adapted to be opened by the collars 58 and 59, respectively, when the drive mechanism has operated to its predetermined limits in the forward and reverse directions. The switches 62 and 63 are secured by a bolt 64 to the housing 24, the bolt 64 being substantially parallel to the shaft 33 as shown in FIG. 2. The switches 62 and 63 have fixed contact arms 66 and 67 respectively, and movable contact arms 68 and 69 respectively. The movable contact arms 68 and 69 are, of course, actuated by the respective collars 58 and 59. A preferred mode of connecting the switches 62 and 63 in circuit with the motor will be discussed hereinafter.

In the present drive mechanism having limit switches, provision is made to disable the switch 49 just prior to the stopping of the motor by the limit switch controlling lowering of the garage door, so that the motor will not immediately raise the door. To this end, a third normally closed switch 71 is mounted on the bolt 64. The switch 71 also has a fixed contact arm 72 and a movable contact arm 73. In the present instance, the switch 71 is mounted in spaced relation between the switches 62 and 63 but nearer the latter, the spacing of the switches 62, 71 and 63 being maintained by a plurality of sleeve insulators 74 carried by the bolt 64. The arrangement shown in FIG. 2 permits the movable contact arm 73 of the switch 71 to be engaged by the collar 59 and opened before switch 63 is opened. The movable contact arms 69 and 73 are interconnected by a lost motion linkage comprising in the present instance a push rod 74 having a head 75 and loosely fitting in holes in the arms 69 and 73, and a spacer 76 carried by the rod 74 between the movable contact arms 69 and 73. The collar 59 will first engage the head 75 to open switch 71 when the mechanism has operated a predetermined amount in the reverse direction. Travel of the collar 59 a further predetermined amount is sufficient to take up the lost motion and move the spacer 76 into engagement with the arm 69 of the switch 63 to open the latter switch.

FIG. 2 also shows how the electrical elements of the foregoing drive mechanism are preferably connected for operating garage door opening and closing apparatus. The motor 11 has its field windings 17 and 18 connected in a motor circuit as shown in my Patent 2,847,629 so that the motor is instantly reversible. The terminal 35, common to the windings 17 and 18, is connected to an overload protective device 80 and the latter is connected by a conductor 77 to a terminal 78 on a terminal block 90, the terminal 78, in turn, being connected to one lead 79 of a power cable 81. The other lead 82 of the power cable 81 is connected to a second terminal 83 on the terminal block 90, and the terminal 83 is connected by a conductor 84 to a movable arm 86 of a double-pole, double-throw relay 87. In one position, the arm 86 engages a fixed contact 88 which, in turn, is connected by a conductor 89 to the movable contact arm 68 of the limit switch 62. The fixed contact arm 66 of the limit switch 62 is connected by a conductor 91 to the end of the field winding 17 that is connected to the capacitor 34. Thus the circuit branch, including the terminal 78, the conductor 77, the overload protective device 80, the field windings 17 and 18, the conductor 91, the limit switch 62, the conductor 89, the fixed contact 88, the movable arm 86 and the conductor 84 will cause the motor 11 to operate in the forward direction.

The motor circuit includes a second circuit branch for operating the motor in the reverse direction. Thus, the second circuit branch includes a conductor 92 which connects the movable contact 69 of the limit switch 63 to the end of the field winding 18 that is connected to the capacitor 34 through the centrifugal switch 36. The fixed contact arm 67 of the limit switch 63 is connected by a conductor 93 to another fixed contact 94 that is engageable by the movable arm 86 of the relay 87. Thus, the second circuit branch for operating the motor in the reverse direction includes the terminal 78, the conductor 77, the overload protector 80, the field windings 17 and 18, the conductor 92, the limit switch 63, the conductor 93, the fixed contact 94, the movable arm 86, the conductor 84, and the terminal 83.

To make the motor 11 instantly reversing, as shown in my previously mentioned patent, the rotation sensing switch 37 is arranged to connect the capacitor 34 between the field windings 17 and 18, even when the centrifugal switch 36 is open, if the movable arm 86 is suddenly shifted from one of its associated fixed contacts to the other. To this end, a movable contact arm 96 of the rotation sensing switch 37 is connected by a conductor 97 to one side of the centrifugal switch 36. A first fixed contact 98, engaged by the movable contact arm 96 when the motor operates in the forward direction, is connected by a conductor 99 to a fixed contact 101 of the relay 87. The fixed contact 101 is engaged by a second movable arm 102 of the relay 87 when the first movable arm 86 engages its fixed contact 94. The second movable arm 102 is connected by a conductor 103 to the movable contact arm of the limit switch 63 and by the conductor 92 to the opposite side of the centrifugal switch 36. A second fixed contact 104 in the rotation sensing switch 37, engaged by the movable contact 96 when the motor 11 operates in the reverse direction, is connected by a conductor 106 to a fixed contact 107 of the relay 87. The fixed contact 107 is engaged by the movable arm 102 when the movable arm 86 is in engagement with its fixed contact 88. Thus, it can be seen that the rotation sensing switch 37 establishes an open shunt circuit around the centrifugal switch 36 upon operation in the forward direction and establishes another open shunt circuit upon operation in the reverse direction. When the relay 87 is actuated to change direction of operation of the motor, the established shunt circuit is closed by the movable arm 102 and a reverse torque immediately develops in the motor 11 in the manner fully explained in my said patent.

It is often desirable to operate garage door opening and closing apparatus from remote locations. For this reason, the relay 87 is preferably of the form that alternately shifts its movable arms 86 and 102 in unison from one set of contacts to the other set of contacts each time the relay is energized, even if energization is only momentary. The relay 87 has its actuating coil 108 connected in series with secondary winding 109 of a transformer 111 across a pair of terminals 112 and 113. The primary winding 114 of the transformer 111 is connected across the terminals 78 and 83 through the overload protector 80 and in parallel with the motor field windings 17 and 18. Thus, the overload protector 80 is responsive to the total current drawn by the motor 11 and the transformer 111. However, the transformer 111 is continuously energized when the terminals 78 and 83 are connected to the line.

The motor 11 is started by energizing the relay coil 108 thereby shifting the movable arms 86 and 102 from one set of fixed contacts to the other. Energization of the relay coil 108 is simply accomplished by completing the circuit between the terminals 112 and 113. For this purpose, a normally open manual switch 116 is connected between the terminals 112 and 113. A momentary closure of switch 116 effects momentary energization of the relay 87. Energization may also be effected by radio control or light control mechanism (not shown), when desired, by connecting such mechanisms across a pair of terminals 117 and 118 in parallel with the switch 116.

In the instant circuit, the load responsive switch 49 is connected as a safety switch to prevent damage in the event the garage door meets an obstruction during closing. To accomplish this, the switch 49 is connected across the terminals 112 and 113. Closure of the switch 49, in response to overload caused by the door encountering such obstruction, effects energization of the relay 87 and changes motor operation to the forward direction. However, when the garage door reaches its fully closed position, a load, sufficient to cause closure of the switch 49, may be exerted on the drive. Consequently, it is preferable that the switch 49 be disabled during the last few inches of door travel in the downward direction. Accordingly, the switch 71, arranged to open prior to the stopping of the motor by the limit switch 63, is connected in series with the switch 49. Thus, one side of the switch 49 is connected by a conductor 119 to the terminal 112. The other side of the switch 49 is connected by a conductor 121 to the movable contact arm 73 of the switch 71, and the fixed contact arm 72 of the switch 71 is connected by a conductor 122 to the terminal 113. Thus, when the switch 71 is closed the safety switch 49 is operative, and when the switch 71 is open the switch 49 is disabled.

The present circuit also includes a light 123 arranged so that it will be lighted when the garage door is open or being opened. The light can be located in any desired position, such as on the outside of the garage where it is visible from the owner's residence. The light is connected by a conductor 124 to the terminal 78 and by another conductor 126 to the movable contact arm 68 of the switch 62. Thus, the light 123 is connected across the terminals 78 and 83 when the arm 86 engages its associated fixed contact 88.

Operation of the drive mechanism connected as shown in FIG. 2 is initiated by energizing the relay 87, as by closing the switch 116. This causes the arms 86 and 102 to shift from one set of contacts to the opposite set of contacts. For example, if, during the preceding operation, the mechanism was operated in the reverse direction (the direction for closing the garage door), the arms 86 and 102 occupy the position shown by the solid lines. Also, the collars 58 and 59 are located to the right of the position shown in the drawing, the collar 59 holding the switches 63 and 71 open. However, the switch 62 is closed. Upon energization of the relay 87, the arms 86 and 102 are shifted to the positions shown by the dotted lines, thereby closing the circuit branch for operating the drive in the forward direction (the direction for opening the garage door). Therefore, the circuit branch connecting the field winding 17 as the running winding across the line and connecting the field winding 18 in series with the capacitor 34 is closed and the motor commences to operate in the forward direction. In this instance, of course, the centrifugal switch 36 is closed. As the motor begins to rotate in the forward direction the rotation sensing switch 37 shifts its movable arm 96 into engagement with the contact 98 placing the switch in series with the fixed contact 101 of the relay 87. When the motor attains operating speed, the centrifugal switch 36 opens and disconnects the field winding 18 from the circuit. As operation progresses the collars 58 and 59 are shifted axially to the left on the shaft 33 to permit the switches 63 and 71 to close, and when the door is substantially open the collar 58 opens the limit switch 62 which, in turn, stops the motor. The motor will remain stopped until the relay 87 is again energized, as by closing the switch 116 momentarily.

The succeeding energization of the relay 87 causes it to shift its movable contact arms 86 and 102 back to the position engaging the fixed contacts 94 and 101, respectively. This connects the motor 11 for operation in the reverse direction. Since the collar 59 is in its lefthand position, the switches 63 and 71 are closed. Thus, the winding 18 is connected across the terminals 78 and 83 as the running winding, and the winding 17 is connected in series with the capacitor 34 as a starting winding so that the motor will operate in the reverse direction for lowering the door. As the motor starts, the movable contact 96 of the rotation sensing switch 37 will shift from engagement with the contact 98 into engagement with the contact 104, setting up the other shunt circuit for instantly reversing the motor when necessary. When the motor attains operating speed, the centrifugal switch 36 will again open to cut out the winding 17. As operation progresses, the collars 58 and 59 will shift to the right on the shaft 33, permitting the switch 62 to close. After a predetermined amount of operation in the reverse direction the collar 59 engages the rod 74 and opens the switch 71, disabling the switch 49. A short time thereafter the spacer sleeve 76 opens the limit switch 63 as a consequence of the collar 59 shifting further to the right. Preferably, switches 63 and 71 and their associated collar 59 are arranged so that the collar 59 will open the switch 71 when the door is about 5 inches from its fully closed position and will open the switch 73 when the door is about 1 inch from the fully closed position. The final inch of travel to the closed position is accomplished by coasting of the motor.

The motor may be manually reversed at any time. Thus, if the manual switch 116 is actuated while the drive is operating in either direction, the drive will immediately change to the opposite direction of operation because of the circuit arrangement.

In the event the door encounters some obstruction when the drive is being operated in the reverse direction, that is, when the door is being closed, an increased load is suddenly applied to the drive. This in turn generates a thrust on the rotor shaft 19, through the worm wheel 32 and the worm 31, sufficient to move the shaft 19 axially and compress the spring 39. Such axial movement of the shaft 19 permits the switch 49 to close and energize the relay 87. Instantly the relay 87 shifts its movable arms 86 and 102 to the opposite contacts 88 and 107, respectively, and with the rotation sensing switch 37, instantly changes the direction of operation of the motor so that the door is again moved upwardly away from the obstruction.

From the foregoing it is apparent that the present invention provides a novel drive mechanism which has a load responsive control or safety device which may be connected to instantly reverse the operation of the motor when the drive mechanism is subjected to a load exceeding a predetermined value. The mechanism is reliable, compact, simple and inexpensive. The drive mechanism is particularly adapted for use in conjunction with garage door opening and closing apparatus and the like.

I claim:

1. The combination of drive mechanism including a motor operable in forward and reverse directions, and a shaft driven by said motor and longitudinally movable in response to a predetermined load thereon when the motor is operating in said reverse direction, circuit means for operating said motor in said forward and reverse directions including manually controlled means for initiating operation in either direction and means for changing the direction of motor operation during operation, and safety means operable in response to said longitudinal movement of said shaft when the motor is operating in the reverse direction and cooperating with said direction changing means to actuate said direction changing means, thereby stopping operation of the motor in the reverse direction and initiating operation in the forward direction when said predetermined load occurs.

2. The combination according to claim 1, including means for disabling said safety means when the motor approaches the limit of its operation in the reverse direction and in which said circuit means includes means for limiting the operation of the motor in each direction.

3. The combination according to claim 2, in which said limiting means comprises a pair of switches, and means responsive to the operation of the motor in the respective directions for actuating said switches, and said disabling means comprises a third switch operable by said switch actuating means when the motor approaches the limit of operation in the reverse direction.

4. The combination of claim 3, in which said pair of switches are spaced from each other, and said actuating means is interposed therebetween and is movable in opposite directions on operation of the motor in opposite directions to actuate the respective switches of said pair, and said third switch is located adjacent one of said pair of switches and is adapted to be actuated by said actuating means as said actuating means approaches said one switch.

5. The combination of claim 4, in which said actuating means comprises a screw driven by said motor, and a pair of collars mounted on said screw and interposed between said pair of switches, said collars being adapted to be driven longitudinally of said screw upon operation of the motor for actuating the respective switches of said pair, one of said collars being adapted to actuate said third switch as said one collar approaches said one switch.

6. The combination according to claim 3, in which one switch of said pair of switches stops said motor to limit its operation in the reverse direction and the other switch of said pair of switches stops said motor to limit its operation in the forward direction, and in which said third switch and said one switch are interconnected by a lost motion linkage for actuating said one switch after and as a consequence of the actuation of said third switch by said actuating means.

7. The combination according to claim 6, in which said switches are all normally closed switches, said switch actuating means being adapted to open the respective switches.

8. The combination according to claim 6, in which said switches have movable contact arms, and said linkage comprises a rod interconnecting said contact arms in said third switch and said one switch, said rod being longitudinally slidable with respect to at least one of said arms, and a spacer element on said rod between said arms, said spacer element being engageable with the contact arm of said one switch by movement of the contact arm of said third switch.

9. The combination according to claim 1, in which said circuit means includes a double-throw relay connected to change the direction of operation of the motor each time said relay is energized, said manually controlled means and said safety means being connected to effect energization of said relay.

10. The combination according to claim 9, in which said manually controlled means is a manual switch and said safety means include a switch actuated in response to the longitudinal movement of said shaft, said shaft actuated switch and said manual switch being connected in parallel relation in series with said relay.

11. The combination according to claim 2, in which said safety means includes a safety switch closable in response to said longitudinal movement of said shaft, said disabling means including a normally closed switch connected in series with said safety switch, and means for opening said normally closed switch when the motor approaches the limit of its operation in the reverse direction.

12. In combination, a reversible electric motor, drive means for connecting said motor to a driven mechanism, a control circuit for connecting the motor across a line and including a first circuit branch arranged when closed to operate said motor in the forward direction and a second circuit branch arranged when closed to operate said motor in the reverse direction, circuit closing means for closing one branch and then the other branch alternately upon each successive actuation of said closing means, manually controlled means for actuating said circuit closing means, and safety means associated with said drive means for actuating said circuit closing means when a force exerted by said drive means in one direction exceeds a predetermined value.

13. The combination according to claim 12, in which said circuit closing means comprises a double-throw relay having a movable contactor shiftable alternately between two positions each time the relay is energized, said manually controlled means and said safety means being adapted to energize said relay when actuated.

14. In combination, a reversible electric motor having an axially shiftable rotor shaft, drive means for connecting said rotor shaft to a driven mechanism and for shifting said rotor shaft axially when a force exerted by said drive means exceeds a predetermined value, a control circuit for connecting said motor across a line and including a first circuit branch arranged to operate said motor in the reverse direction when closed and a second circuit branch arranged to operate said motor in the forward direction when closed, circuit closing means operable under one condition to close said first branch and to open said second branch, and operable under another condition to close said second branch and to open said first branch, and safety means associated with said rotor shaft and said circuit closing means and operable under said one condition to shift said closing means to close said second branch and open said first branch in response to axial shifting of said rotor shaft.

15. A drive mechanism comprising a reversible electric motor, drive means for connecting said motor to a driven mechanism, control circuit for said motor including switch means operable to connect said motor for operation in forward and reverse directions and manually operable means for actuating said switch means while said motor is operating in one direction to connect said motor to effect operation in the other direction, and safety means responsive to a predetermined load on said drive means when said motor is operating in one direction, said safety means actuating said switch means to change said connections and thereby connect the motor to operate in the opposite direction when said predetermined load is encountered.

16. A drive mechanism comprising a reversible electric motor having a pair of windings operable as starting and running windings for starting and operating the motor in opposite directions, drive means for connecting the motor to a driven mechanism, circuit means connected to said windings and including reversing switch means and a centrifugal switch, said centrifugal switch being operable to cut out the winding functioning as a starting winding when the motor reaches a predetermined speed in either direction, and safety means responsive to a predetermined load on said drive means when the motor is operating in one direction, said safety means actuating said reversing switch means to provide a shunt around said centrifugal switch and connecting said windings for operation in the other direction to immediately apply a reversing torque to said motor to stop the motor and restart it in the opposite direction.

References Cited in the file of this patent
UNITED STATES PATENTS

| | | |
|---|---|---|
| 1,719,517 | Moore | July 2, 1929 |
| 2,253,170 | Dunham | Aug. 19, 1941 |
| 2,548,709 | Drexler | Apr. 10, 1951 |